United States Patent [19]
Maeda

[11] Patent Number: 5,269,583
[45] Date of Patent: Dec. 14, 1993

[54] FRONT END STRUCTURE OF VEHICLE BODY

[75] Inventor: Ryoji Maeda, Kanagawa, Japan

[73] Assignee: Nissan Motor Co., Ltd., Yokohama, Japan

[21] Appl. No.: 879,420

[22] Filed: May 7, 1992

[30] Foreign Application Priority Data

May 30, 1991 [JP] Japan .................. 3-39527[U]

[51] Int. Cl.⁵ .............................. B62D 25/08
[52] U.S. Cl. .................... 296/192; 296/194
[58] Field of Search ............. 180/69.21; 296/29, 30, 296/188, 189, 192, 194

[56] References Cited

U.S. PATENT DOCUMENTS 3,815,176  6/1974  Porter ............... 180/69.21 X
4,753,475  6/1988  Mochida ............ 296/192

FOREIGN PATENT DOCUMENTS 151513  11/1977  Japan.
25280   2/1987   Japan.
60480   4/1987   Japan.
93124   7/1987   Japan.
261526  11/1987  Japan.
4622    2/1991   Japan.

Primary Examiner—David M. Mitchell
Assistant Examiner—Andrew C. Pike
Attorney, Agent, or Firm—Foley & Lardner

[57] ABSTRACT

A front end structure of a vehicle body includes a front pillar and a cowl member. The cowl member has a top panel and a side panel including a top wall secured to the top panel. A hinge brace is secured to the top wall of the side panel of the cowl member and the front pillar. A hood hinge is secured to the top panel and the top wall of the side panel of the cowl member, and the hinge brace. The top panel, the top wall of the side panel of the cowl member, and the hinge brace are disposed in an overlapped relationship.

11 Claims, 3 Drawing Sheets

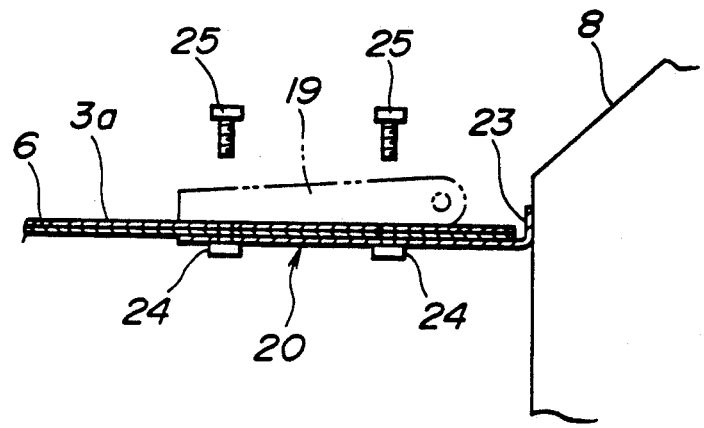
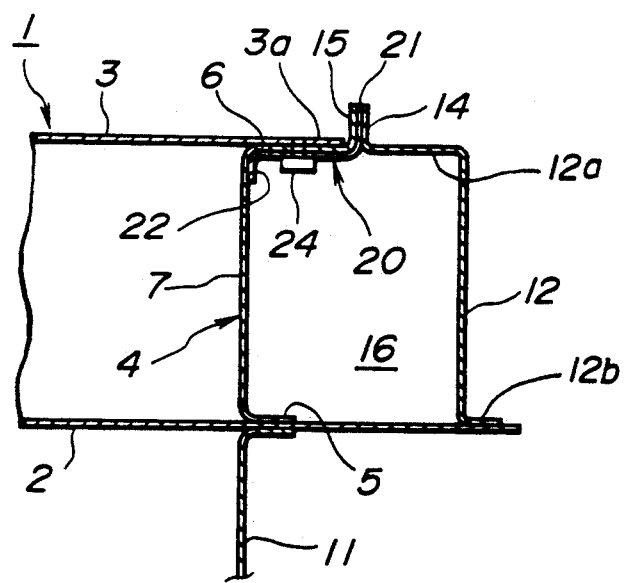

FRONT END STRUCTURE OF VEHICLE BODY

BACKGROUND OF THE INVENTION

The present invention relates to a front end structure of a vehicle body.

Japanese Utility Model Application Second Publication No. 3-4622 discloses a front end structure of a vehicle body comprising a cowl member between vertically extending right and left front pillars and hood ledge structures extending forwardly from the cowl member. Secured to each of the hood ledge structures is a strut housing for supporting a front suspension strut. A cowl top brace is secured to the top wall of the corresponding hood ledge structure, the top panel of the cowl member and the strut housing. Due to the provision of the cowl top brace, a load applied to the strut housing is shared by the hood ledge structure and the cowl member.

SUMMARY OF THE INVENTION

An object of the present invention is to provide a front end structure of a vehicle body which exhibits a good performance during front end collision.

A specific object of the present invention is to provide a front end structure which prevents rearward displacement of hood hinges during front end collision.

A further specific object of the present invention is to provide a front end structure which allows provision of a collapsible zone.

According to the present invention, there is provided a front end structure comprising:

a front pillar;

a cowl member having a top panel and a side panel including a top wall secured to the top panel;

a hinge brace secured to the top wall, the hinge brace including an end portion secured to the front pillar; and a hood hinge secured to said top panel, the top wall and the hinge brace. The top panel, the top wall and the hinge brace are disposed in overlap relationship.

BRIEF DESCRIPTION OF THE DRAWINGS

FIG. 2 is a sectional view taken along line 2—2 of FIG. 1;

FIG. 3 is a sectional view taken along line 3—3 of FIG. 1; and

DESCRIPTION OF THE PREFERRED EMBODIMENT

Figure 1:
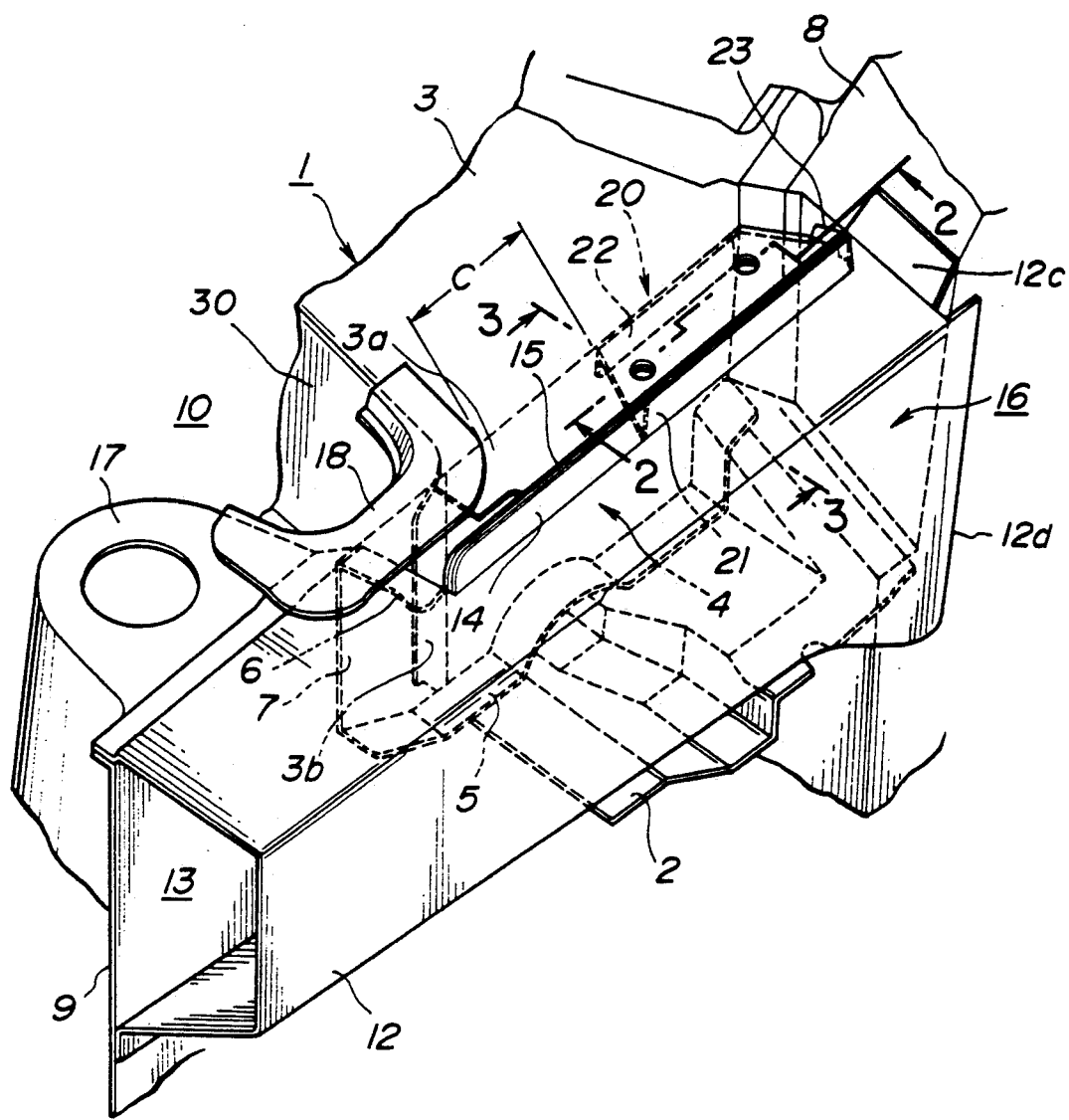
FIG. 1 is a perspective fragmentary view of a first embodiment of a front end structure according to the present invention.

Referring now to FIG. 1, there is shown a perspective fragmentary view of a left front end structure of a vehicle body. A right front end structure of the vehicle body is similar to the left front end structure, though it is not shown in the drawings. The left front end structure comprises a left front pillar 8 and a cowl member 1 mounted on a dash upper panel 2. The cowl member 1 and the dash upper panel 2 extend in a transverse direction of the vehicle body. The cowl member 1 has a top panel 3 with a laterally extending flange 3a, a front panel 30 with a forwardly extending flange 3b and a left side panel 4 of a channel cross-sectional shape. The side panel 4 includes an upright wall 7 and bottom and top walls 5 and 6 extending in the same direction from upper and lower ends of the upright wall 7. As shown in FIG. 3, the bottom wall 5 is secured to an upper side face of the dash upper panel 2 which has a lower side face secured to a dash side panel 11 secured to and extending downwardly from the dash upper panel 2. The top wall 6 of the side panel 4 is secured to the flange 3a of the top panel 3 and terminates in an upright flange 15. The upright wall 7 is secured to the flange 3b of the front panel 30. The side panel 4 of the cowl member 1 has a rear end spaced from the left front pillar 8 in order to allow a dislocation caused upon assembly. The side panel 4 has a front portion secured to a hood ledge panel 9. The hood ledge panel 9 defines a side wall of an engine compartment 10. Although not shown, the hood ledge panel 9 has a rear end portion connected to the dash side panel 11 and a dash lower panel which extends downwardly from the dash side panel 11.

Secured to an upper portion of the hood ledge panel 9 is a hood ledge reinforcing member 12 extending in a longitudinal direction of the vehicle body. The hood ledge reinforcing member 12 has a front portion with a channel cross-sectional shape and a rear portion with an L-shaped cross section. As shown in FIG. 1, the front portion of the hood ledge reinforcing member 12 has a vertical wall and upper and lower walls extending inwardly from upper and lower ends of the vertical wall and connected to the hood ledge panel 9 so as to define a closed cross section 13. As best seen in FIG. 3, the rear portion of the hood ledge reinforcing member 12 includes an upper wall 12a continuously extending from the upper wall of the front portion and having an upright flange 14. The upright flange 14 is secured to the flange 15 of the side panel 4 of the cowl member 1. The rear portion also has a vertical wall continuously extending from the vertical wall of the front portion. The vertical wall of the rear portion of the hood ledge reinforcing member 12 has a lower flange 12b secured to the dash upper panel 2. The rear portion further has end flanges 12c and 12d secured to the left front pillar 8 as shown in FIG. 1. Thus, the rear portion defines a closed cross section 16 continuously communicating with the closed cross section 13 of the front portion in cooperation with the side panel 4 of the cowl member 1 and the dash upper panel 2, as best seen in FIG. 3.

Secured to the inside of the upper portion of the hood ledge panel 9 is a left strut housing 17 which supports a left front suspension strut (not shown). The strut housing 17 is located adjacent the cowl member 1 and has a top wall which is connected to the top panel 3 of the cowl member 1 via an upper end of the hood ledge panel 9, the upper wall of the hood ledge reinforcing member 12 and the top wall 6 of the side panel 4 of the cowl member 1. A cowl top brace 18 is secured to the top wall of the strut housing 17, the upper end of the hood ledge panel 9, the upper wall of the hood ledge reinforcing member 12 and the top panel 3 of the cowl member 1. Due to the cowl top brace 18, vertical load applied to the strut housing 17 is shared by the cowl member 1 and the left front pillar 8 in addition to the strut housing 17, thus providing a rigid structure strong enough to withstand the load.

As shown in FIG. 2, the top wall 6 of the side panel 4 of the cowl member 1 is secured to the flange 3a of the top panel 3. A hinge brace 20 is secured to a lower side of the top wall 6. As best seen in FIG. 3, the hinge brace 20 has lateral flanges 21 and 22 extending in opposite directions. The flange 21 is interposed between and secured to the flange 14 of the hood ledge reinforcing member 12 and the flange 15 of the side panel 4 of the cowl member 1, while the flange 22 is secured to the upright wall 7 of the side panel 4, as shown in FIG. 3. The hinge brace 20 has a rear end flange 23 secured to the left front pillar 8. The hinge brace 20 provides an enhanced structural rigidity.

In FIG. 2, a hood hinge 19 is secured to the flange 3a of the top panel 3 of the cowl member 1 by means of bolts 25 which extend through the flange 3a, the top wall 6 and the hinge brace 20 and are secured into the corresponding lock nuts 24.

Referring to FIGS. 1 and 3, the dash upper panel 2, the side panel 4 of the cowl member 1, the hood ledge panel 9 and the hood ledge reinforcing member 12 co-operate with each other to form a longitudinal beam structure extending forwardly of the front pillar 8. Upon application of load to the front body structure, for instance, upon collision, the front portion of the longitudinal beam structure which has the closed cross section 13 is deformed first, prior to deformation of a mid portion of the longitudinal beam structure reinforced by the cowl top brace 18. In the rear portion of the longitudinal beam structure which has the closed cross section 16, there is provided, as shown in FIG. 1, a collapsible zone C between the cowl top brace 18 and the hinge brace 20. With this collapsible zone C, the load exerted upon collision is properly absorbed through deformation of the collapsible zone C.

Further, since the hinge brace 20 is secured to the lower side of the top wall 6 of the side panel 4, an upper side of the flange 3a of the top panel 3 is maintained in a flat state without any projections due to mounting of such components thereon. This configuration facilitates mounting of a front fender and an engine hood (neither are shown) on the flange 3a.

Figure 4:
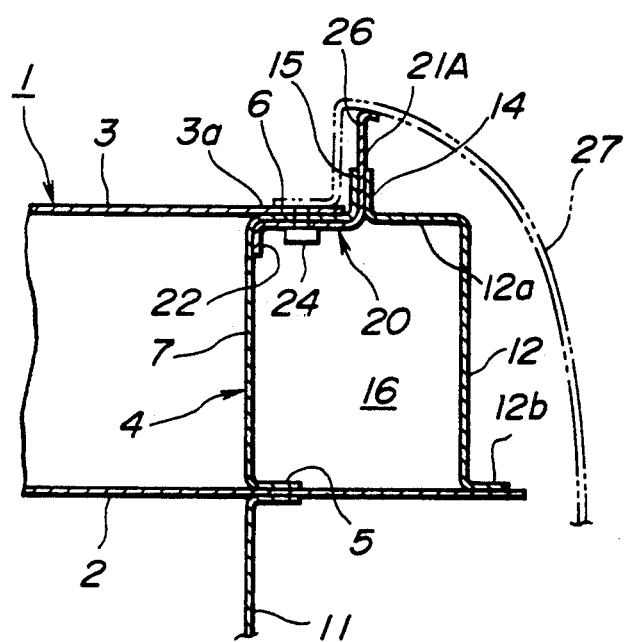
FIG. 4 is a sectional view similar to FIG. 3, showing a second embodiment.

Referring to FIG. 4, a second embodiment of a front end structure is shown. The second embodiment s is substantially the same as the first embodiment except for the structure of a flange 21A of a hinge brace 20.

As shown in FIG. 4, the flange 21A of the hinge brace 20 has an upward extension projecting beyond top ends of flanges 14 and 15 so as to provide a fender support guide 26 for supporting a front fender 27. The fender support guide 26 makes it easier to assemble the front fender 27 because positioning and mounting of the front fender 27 on the flange 3a is readily accomplished merely by sliding it along the fender support guide 26.

What is claimed is:

1. A front end structure of a vehicle body comprising:
   a front pillar;
   a cowl member having a top panel and a side panel including a top wall secured to said top panel;
   a hinge brace secured to said top wall, said hinge brace including an end portion secured to said front pillar; and
   a hood hinge secured to said top panel, said top wall, and said hinge brace.

2. A front end structure as claimed in claim 1, wherein said top panel, said top wall, and said hinge brace are disposed in overlap relationship.

3. A front end structure as claimed in claim 1, further including a hood ledge reinforcing member opposed to said side panel, said hood ledge reinforcing member including a top wall with a flange.

4. A front end structure as claimed in claim 3, wherein said top wall of said side panel includes a flange, and said hinge brace has a flange interposed between and secured to said flange of said top wall of said side panel and said flange of said top wall of said hood ledge reinforcing member.

5. A front end structure as claimed in claim 4, wherein said side panel further includes an upright wall and said hinge brace further has a second flange secured to said upright wall of said side panel.

6. A front end structure as claimed in claim 4, wherein said flange of said hinge brace has an extension which projects beyond top ends of said flange of said top wall of said side panel and said flange of said top wall of said hood ledge reinforcing member so as to provide a fender support guide for supporting a front fender.

7. A front end structure as claimed in claim 3, further including a hood ledge panel extending forwardly from said cowl member, said hood ledge reinforcing member being secured to said hood ledge panel.

8. A front end structure as claimed in claim 7, further including a strut housing secured to said hood ledge panel.

9. A front end structure as claimed in claim 8, further comprising a cowl top brace secured to said strut housing, said hood ledge panel, said hood ledge reinforcing member, and said cowl member.

10. A front end structure as claimed in claim 9, wherein said cowl top brace is spaced from said hinge brace.

11. A front end structure as claimed in claim 10, wherein said cowl top brace and said hinge brace provide a collapsible zone disposed therebetween.

* * * * *